United States Patent [19]
Leese

[11] Patent Number: 5,536,468
[45] Date of Patent: Jul. 16, 1996

[54] METHOD OF MAKING WATERMARKS ON SYNTHETIC PAPER

[75] Inventor: Leonard Leese, Manningtree, United Kingdom

[73] Assignee: Arjobex Limited, London, England

[21] Appl. No.: 345,845

[22] Filed: Nov. 28, 1994

Related U.S. Application Data

[63] Continuation-in-part of Ser. No. 342,386, Nov. 18, 1994, abandoned.

[30] Foreign Application Priority Data

Nov. 26, 1993 [GB] United Kingdom ............... 9324337
Dec. 17, 1993 [GB] United Kingdom ............... 9325861

[51] Int. Cl.⁶ .................... B29C 47/06; B29C 59/04; B29C 55/12
[52] U.S. Cl. .................. 264/446; 264/21; 264/448; 264/132; 264/175; 264/210.7; 264/284; 264/290.2; 264/171.13; 427/157; 425/363; 425/385
[58] Field of Search ................ 264/22, 175, 288.4, 264/290.2, 210.7, 211.12, 284, 288.8, 289.3, 21, 446, 448, 132, 171.1, 171.13; 425/385, 363, 174.8 E; 427/157

[56] References Cited

U.S. PATENT DOCUMENTS 3,664,780  5/1972  Fairbanks et al. .
3,850,667  11/1974  Tani et al. .
3,876,735  4/1975  Bontinck et al. .
4,520,063  5/1985  Simon et al. .
5,275,870  1/1994  Halope et al. .

FOREIGN PATENT DOCUMENTS 203499    12/1986  European Pat. Off. .
0374930   6/1990   European Pat. Off. .
0470760   2/1992   European Pat. Off. .
2353676   12/1977  France .
9107285   5/1991   WIPO .

OTHER PUBLICATIONS

Derwent Database Abstract, JP-B-57049373.

Primary Examiner—Mathieu D. Vargot
Attorney, Agent, or Firm—Brooks Haidt Haffner & Delahunty

[57] ABSTRACT

A process is provided for creating a watermark on a polymeric sheet. The sheet is passed between abutting rollers, at least one of said rollers having a recessed and/or raised motif, to form an impression on the sheet corresponding to the motif, and then orienting by stretching the sheet. The impressed and oriented sheet has dark areas corresponding to the raised portions and light areas corresponding to recessed portion of the motif.

15 Claims, 2 Drawing Sheets

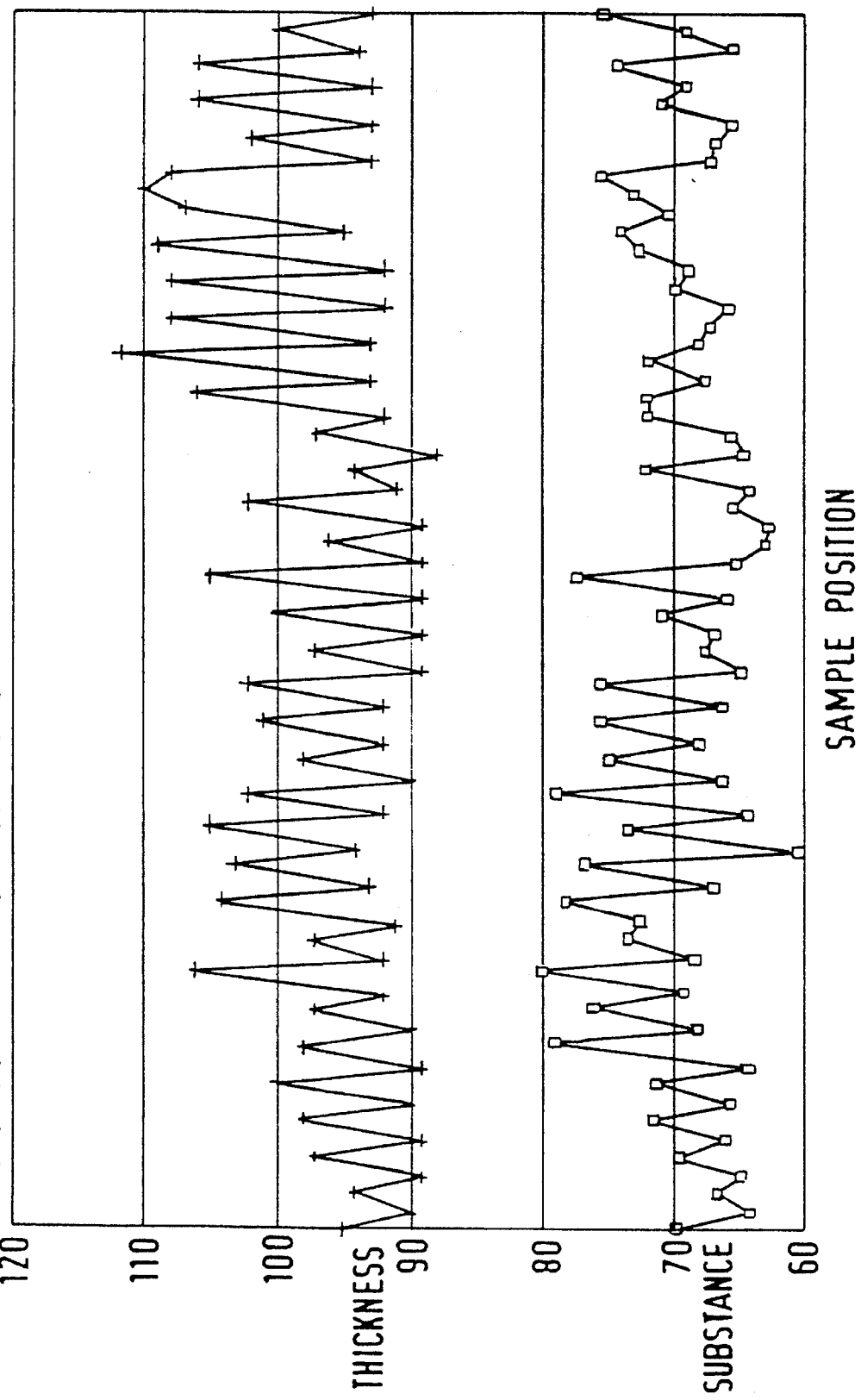

METHOD OF MAKING WATERMARKS ON SYNTHETIC PAPER

This application is a continuation-in-part of earlier application Ser. No. 08/342,386 filed Nov. 18, 1994, now abandoned.

FIELD OF THE INVENTION

This invention relates to a method of placing a watermark on eg documents, securities or currency made from synthetic paper which mark is visible under transmitted light.

BACKGROUND OF THE INVENTION

It is well known to introduce water marks on paper. The application of watermarks has hitherto been done in a variety of ways. One such method is to form the watermarks during the manufacture of the paper by means of round moulds bearing impressions which are recessed and/or in relief, with the aid of watermarking rollers bearing designs which are recessed and/or, raised, associated with a flat table (Fourdrinier machine). This method then makes it possible to obtain an image which, when the sheet of paper is viewed in transmitted light, appears either as a light impression (when using a roller with a relief design) or as a dark impression (when using a roller with a recessed design). The clear areas are due to the fact that the thickness of the sheet and the density of the fibers are less than the thickness of the sheet and the corresponding areas where the roller has not left an impression.

A further method is to create pseudo-watermarks by printing or depositing a compound, generally greasy, which renders the sheet of paper permanently transparent. The transparent effect can equally well be created by means of a heat-fusible material such as polyethylene as described in EP-A-203499. In the latter reference, the pseudo-watermark is applied to a sheet of paper which comprises a thermally sensitive material, and heat is applied to a part of the surface of the paper in a manner to cause a region of the paper to become irreversibly translucent.

Yet another method of creating a watermark on a sheet of paper is to control the opacity of pre-defined areas of the paper using an opacifier. FR-A-2353676 describes such a process. The opacifier may be an aqueous suspension of a pigment or other chemical compound which in turn may be a coloured compound or an ink. The opacifier is applied during the manufacture of the sheet, on the fibrous nap and before it is raised from the backcloth, in such a manner that said opacifier penetrates into the interstices of the nap at predefined areas, thereby changing the opacity thereof upon drying. This technique has the disadvantage that it requires special roller arrangements to apply the opacifier and equipment to enable the opacifier to penetrate the nap interstices.

Again U.S. Pat. No. 4,520,063 describes a sheet made of synthetic resin containing security markings which are similar to watermarks. Two cross-linkable colourants, which have different rates of migration into the surface of a sheet in the presence of a cross-linking agent, are applied on the sheet. Subsequent cross-linking of the colourant when the desired migration depth has been reached, by the colourant penetrating at least a part of the thickness of the sheet to correspond to the selected security feature eg pattern or motif, shows the security feature in congruant fashion on both sides of the sheet. In reflected light, a motif can be seen which bears the colour of this colourant on the surface of the sheet, and in transmitted light a motif of mixed colour can be seen. This process is difficult to apply on a plastic sheet since it requires careful choice of unobvious colourants and cross-linking agents.

A further process is described in EP-A-500726 which describes a process for producing a printable flexible sheet. This sheet incorporates at least one substrate sheet of synthetic material having at least one surface treated with a compound to modify its opacity at pre-determined points in such a way that when viewed by transmitted light, a distinctive security mark can be seen. This compound is then covered by a printable pigmented layer.

As can be seen, most of the above processes are rather complex and involve the use of a numerous additional compounds, colourants, cross-linking agents and/or a plurality of layers. Synthetic papers based on fibrous materials are intrinsically capable of being given a watermark in the same way as cellulosic papers, so that the mark becomes an essential feature of the sheet which is difficult to reproduce.

For synthetic paper based on film, hitherto the methods used have been applied to the synthetic paper film directly or to a fill which is converted to a synthetic paper by coating, as described above. The watermark, as applied in such cases, has essentially its final dimensions and form.

It has now been found that where manufacture of synthetic paper includes a stretching and/or orientation stage(s), suitable modifications of the ingoing sheet prior to orientation by the use of heated rollers or by pressure can produce variations of opacity in the finished sheet which gives the effect of a "watermark" in conventional paper.

SUMMARY OF THE INVENTION

Accordingly, the present invention is a process for creating a watermark on a sheet of polymeric material, said process comprising a. passing the sheet between two rollers in abutment with each other and wherein at least one of the rollers bears motifs which are recessed and/or raised so as to form an impression on the passing sheet which impression corresponds to the recessed and/or raised motifs on said roller(s), and b. orienting by stretching the sheet so impressed such that when viewed in a transmitted light, the oriented sheet exhibits an impression of the motif which is dark in areas corresponding to the raised portions and light in areas corresponding to the recessed portions of the motifs on said roller(s)

In the process of the present invention, the sheet of polymeric material to be stretched and/or oriented is suitably a fill or sheet comprising at least one polyolefin, preferably polyethylene or polypropylene. More preferably, the sheet suitably comprises polyethylene as one of the essential components and is suitably formed by extrusion or calendering. The shut, after stretching and/or orientation is suitably capable of receiving printing thereon and may have been subjected to prior chemical or corona discharge treatment on the surface thereof to improve its receptivity to print or other coating that may be applied thereon. Sheets particularly suitable for this purpose are suitably those produced eg by extrusion of compositions conventionally used for producing polyolefin synthetic papers consisting primarily of polyethylene, ie POLYART® 1 (uncoated) and POLYART®2 (coated)(ex Arjobex Ltd), and co-extruded sheets of the type described in our published EP-A-0470760. The watermark is suitably applied to the film before applying the coating thereon.

DESCRIPTION OF THE PREFERRED EMBODIMENTS

The compositions which may be extruded into sheets are suitably of the type claimed and described in our published GB-A-1470372, GB-A-1490512, GB-A-1487171 and EP-A-0470760 and are incorporated herein by reference to the relevant specifications. A typical composition is one which contains for instance one or more of the following:

| Component | Parts by weight |
| --- | --- |
| High density polyethylene (copolymer) | 100 |
| Calcium-zinc resinate | 5–15 |
| Polystyrene | 4.5–5.5 |
| High density polyethylene (homopolymer) | 17.5–21 |
| Calcium carbonate filler | 15–25 |
| Titanium dioxide | 5–10 |
| Styrene-butadiene copolymer | 0–1.0 |
| Calcium oxide | 0.4–1.0 |

Such compositions can be extruded to form a sheet which is held under tension when passing through conventional rollers and guide rails en route to the orienting/stretching stage whereby the thickness of the sheet is reduced to a significant extent. These stages are conventional and can be inter alia a process as claimed and described in our published GB-A-1442113. The feature of the present invention is that prior to entering the orienting/stretching stage, the sheet is passed through two rollers in abutment with each other and at least one of these two rollers bears on the surface thereof motif(s) which are recessed and/or raised. When the sheet is passed in between these two rollers, an impression of the motif defined by the recessed and/or raised portions is transferred to the sheet passing therethrough. The sheet so impressioned and emerging from these rollers is then subjected to the conventional orienting (stretching) stages.

The recessed and/or in reliefs forming the motif(s) are suitably present on the surface of only one of the rollers. This roller is suitably of a smaller diameter than the other roller in abutment therewith and between which the sheet is passed through. The rollers may be hot or cold and would depend upon the speed of response desired to create an impression on the sheet. The temperature of the roller may thus vary in the range from ambient to a temperature about 5° C. above the machine temperature.

In its simplest form, the motif on the roller can take the form of a series of regular lines parallel to the machine direction on a reel of the sheet. The continual rotation of the roller bearing the motif would impart a repeat pattern in the machine direction as is desired. Such a pattern may consist of a linear design giving a distribution of lines across the web of any desired degree of complexity.

Alternatively, individual motifs may be spaced in a pattern round the circumference of the roll so as to give a repeating pattern along the machine direction. Such patterns may be abstract or figurative in character and can be reproduced in an enlarged form on the finished film based on synthetic paper.

It will be clear that the pattern on the finished sheet retains the form of the impressed pattern but is enlarged according to the stretch ratios applied in the transverse and machine directions. A simple analysis of the stretching process shows that more complex patterns can be reproduced in the same way and the design of suitable rollers for any desired pattern can be determined provided that the stretching of the sheet is uniform. In the case where it is desirable to have non-uniform stretching, analysis of the weight distribution of film in the stretched web will enable the impression of the pattern on the ingoing sheet to be intentionally distorted in the appropriate manner so that the finished sheet, after orientation, has the desired motif or pattern.

After the impression has been formed on the sheet, said sheet is subjected to a conventional orientation (stretching) step as described previously. Such orientation may be in the machine direction or in the transverse direction but will normally be biaxial in both directions, suitably in a stretch ratio from 2:1 to 10:1, preferably from 3:1 to 6:1 in the machine direction and from 3:1 to 6:1 in the transverse direction. Such biaxial orientation may be carried out sequentially or simultaneously by methods known in the art such as that described in our published GB-A-1374574, GB-A-1442113 or GB-A-1490512. The oriented sheet, when viewed in transmitted light, exhibits an impression of the motif which is dark in areas corresponding to but not necessarily identical with the in relief portions and light in areas corresponding to but not necessarily identical with the recessed portions of the motifs on said rollers. The impressions of the motifs formed on the oriented sheet are suitably such that they are not visible, or are only slightly visible, in reflected light but are wholly visible in transmitted light.

After orientation, a coating may be applied on the impressioned sheet while ensuring that the impression remains visible. The coating is suitably that of a pigmented compound which is capable of being printed upon. Such a compound may be a coloured and/or fluorescent compound and is suitably capable of being applied in an aqueous medium. Where a pigmented compound is used, this suitably comprises a mineral such as eg titanium dioxide. The present invention is not limited by the type of pigmented compound that can be used. Such a coating may contain other conventional ingredients such as bonding agents, dispersing agents etc.

The method of the present invention can be applied to any sheet or paper type material made from polymers which are used for producing either bank notes or other documents needing a degree of security, especially documents such as eg deeds, identity cards, passports, engineering drawings and bank cards. For instance, a typical composition (A) comprising the following components was processed:

| Component | Parts by weight |
| --- | --- |
| Rigidex ® 002/55 HD polyethylene copolymer (ex BP Chem Ltd) | 100 |
| Rigidex ® HD6070EA HD polyethylene (ex BP Chemicals Ltd) | 17.6 |
| Polystyrene Grade HF888 (ex BP Chemicals Ltd) | 4.8 |
| Ennesin ® ZC14 (Ca—Zn resinate, ex Leon Frenkel Ltd) | 9.6 |
| Cariflex ® TR1102 (Styrene-butadiene copolymer, ex Shell UK) | 0.6 |
| Anhyd. $CaCO_3$ 2.5μ particle size | 21.0 |
| $TiO_2$ (Rutile) | 5.8 |
| Armostat ® 400 (antistat, ex AKZO Chem Ltd) | 0.14 |
| Armostat ® 375D (antistat, ex AKZO Chem Ltd) | 0.35 |
| Caloxal ® CPA (CaO, ex Sturge Lifford Ltd) | 0.58 |
| Calcium stearate (ex RTZ Chem Ltd) | 0.04 |
| Irganox ® B215 (antiox., ex Ciba Geigy Ind Ltd) | 0.29 |

Within the above composition, the following components were initially separately, melt blended, cooled and diced into masterbatches A1 and A2:

| A1 | | A2 | |
|---|---|---|---|
| CaCO$_3$ | 60% | TiO$_2$ | 60% |
| Rigidex ® HD 6070EA | 39.6% | Rigidex ® HD 6070EA | 39.6% |
| Armostat ® 400 | 0.4% | Calcium stearate | 0.4% |

Masterbatches A1 and A2 were then intermixed in appropriate proportions with the remainder of the ingredients of the composition(A) and fed into a compounding extruder. The resulting composition was extruded into a sheet which was then passed through the rollers.

The present invention is further described specifically with reference to the following drawings:

BRIEF DESCRIPTION OF THE DRAWINGS

In the drawings

FIG. 3 is a graphical representation of Tables 1 and 2.

EXAMPLE

Figure 1:
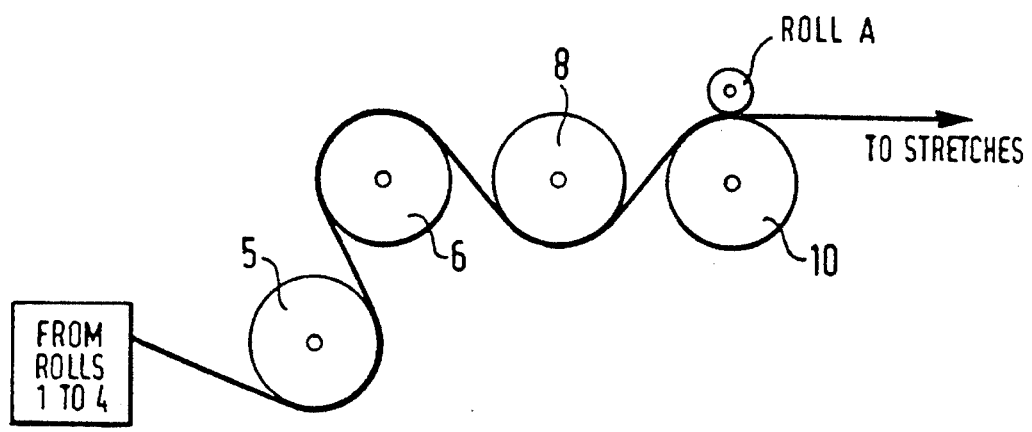
FIG. 1 represents the path of a sheet of polymeric material extruded as above and FIG. 2 represents the impression produced on the sheet which can correspond to a water mark.
Figure 2:
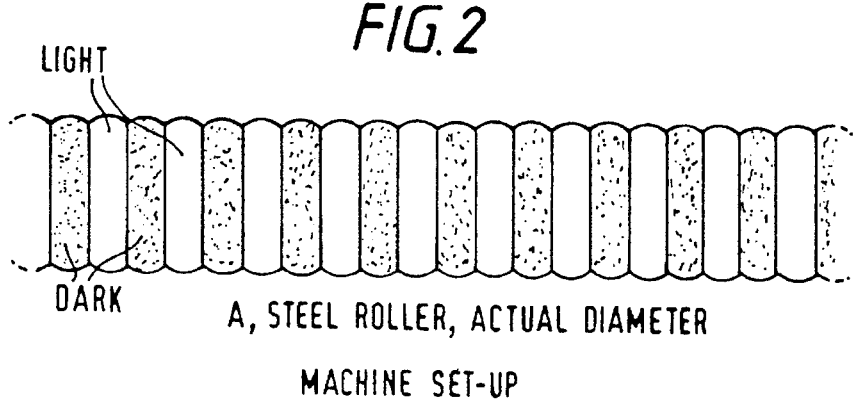

With reference to the drawings, a sheet of polymeric material (1) extruded as above is drawn from a reel (4) is passed around guide rollers 5, 6 and 8 under tension. The sheet is then passed between steel rollers A and 10, roller A carrying the desired motif (which corresponded to that shown in FIG. 2) which in this case is a set of dark and light zones which are parallel to the machine direction. When the sheet emerges from between the rollers A and 10, it carries the impression of the motifs thereon as shown in FIG. 2. This impressioned sheet is then subjected to a conventional stretching and orienting step (not shown).

In use, the dark and light zones on roller A had dimensions of 20×0.5 cms and 10×1.0 cms respectively. A oriented sheets (70 g/m$^2$) was cut into strips marked dark and light and the amount of substance, thickness and density of each strip determined and the results are plotted in FIG. 3. The determination was repeated for bands 1–24 to eliminate any anomalous results and then averaged out. The results as averaged are shown in the Table 1 and 2 below.

From these results it is clear that the change in opacity is essentially the result of an increase in substance, due to cooling.

TABLE 1

ORIENTED SHEET (70 g/m$^2$) SECURITY BASE 1

| Sample Position | Thickness (t, μ) | Substance (s g/m$^2$) | Density (g/m$^3$) |
|---|---|---|---|
| Dark Strips | | | |
| 1 | 95 | 69.6 | 0.733 |
| 2 | 94 | 66.4 | 0.706 |
| 3 | 97 | 69.5 | 0.716 |
| 4 | 98 | 71.5 | 0.730 |
| 5 | 100 | 71.2 | 0.712 |
| 6 | 98 | 79.1 | 0.809 |
| 7 | 97 | 76 | 0.784 |
| 8 | 106 | 80 | 0.755 |
| 9 | 97 | 73.5 | 0.758 |
| 10 | 104 | 78.1 | 0.751 |
| 11 | 103 | 76.8 | 0.746 |
| 12 | 105 | 77.5 | 0.7 |

TABLE 1-continued

ORIENTED SHEET (70 g/m$^2$) SECURITY BASE 1

| Sample Position | Thickness (t, μ) | Substance (s g/m$^2$) | Density (g/m$^3$) |
|---|---|---|---|
| 13 | 102 | 78.9 | 0.774 |
| 14 | 98 | 74.9 | 0.764 |
| 15 | 101 | 75.6 | 0.749 |
| 16 | 102 | 75.7 | 0.742 |
| 17 | 97 | 67.4 | 0.695 |
| 18 | 100 | 70.7 | 0.707 |
| 19 | 105 | 77.3 | 0.736 |
| 20 | 96 | 62.7 | 0.633 |
| 21 | 102 | 65.2 | 0.639 |
| 22 | 94 | 72.2 | 0.768 |
| 23 | 97 | 65.3 | 0.673 |
| 24 | 106 | 72 | 0.679 |
| Mean | 100 | 72.5 | 0.728 |
| Standard Deviation | 4 | 4.7 | 0.041 |
| Light Strips | | | |
| 1 | 90 | 64 | 0.711 |
| 2 | 89 | 64.5 | 0.725 |
| 3 | 89 | 65.8 | 0.739 |
| 4 | 90 | 65.3 | 0.726 |
| 5 | 89 | 64.1 | 0.720 |
| 6 | 90 | 68 | 0.756 |
| 7 | 92 | 69.1 | 0.751 |
| 8 | 92 | 68.3 | 0.742 |
| 9 | 91 | 72.5 | 0.797 |
| 10 | 93 | 66.7 | 0.717 |
| 11 | 94 | 60.2 | 0.64 |
| 12 | 92 | 64.1 | 0.697 |
| 13 | 90 | 66.1 | 0.734 |
| 14 | 92 | 67.9 | 0.738 |
| 15 | 92 | 66.1 | 0.718 |
| 16 | 89 | 64.6 | 0.726 |
| 17 | 89 | 66.5 | 0.747 |
| 18 | 89 | 65.5 | 0.736 |
| 19 | 89 | 65.1 | 0.731 |
| 20 | 89 | 62.3 | 0.7 |
| 21 | 91 | 64 | 0.703 |
| 22 | 88 | 64.3 | 0.731 |
| 23 | 92 | 71.9 | 0.782 |
| 24 | 93 | 67.4 | 0.725 |
| Mean | 91 | 66.0 | 0.729 |
| Standard Deviation | 2 | 2.7 | 0.029 |

TABLE 2

| Strips | BARS 1–24, MEANS | | | | | |
|---|---|---|---|---|---|---|
| | s, g/m$^2$ | Δs | t, μ | Δt | d, g/m$^3$ | Δd |
| Dark | 73 | 4.7 | 100 | 3.7 | 0.728 | 0.41 |
| Light | 66 | 2.7 | 91 | 1.6 | 0.729 | 0.029 |

The above results show that there is approximately a 10% increase in substance in the dark areas of the strip.

We claim:

1. A process for creating a watermark on a sheet of polymeric material, said process comprising
   a. passing the sheet between two rollers in abutment with each other and wherein at least one of the rollers bears motifs which are recessed and/or raised so as to form an impression on the passing sheet which impression corresponds to the recessed and/or raised motifs on said roller(s), and
   b. orienting by stretching the sheet so impressioned such that when viewed in a transmitted light, the oriented sheet exhibits an impression of the motif which is dark in areas corresponding to the raised portions and light in areas corresponding to the recessed portions of the motifs on said roller(s).

2. A process according to claim 1 wherein the sheet of polymeric material oriented is a film.

3. A process according to claim 1 wherein the sheet comprises at least one polyolefin.

4. A process according to claim 1 wherein the polymeric sheer is formed by extrusion or calendering.

5. A process according to claim 1 wherein the sheets are produced by extrusion of compositions consisting primarily of polyethylene and used for producing polyolefin based synthetic papers.

6. A process according to claim 1 wherein the composition which is extruded into sheets comprises the following components:

| Component | Parts by weight |
| --- | --- |
| High density polyethylene (copolymer) | 100 |
| Calcium-zinc resinate | 5–15 |
| Polystyrene | 4.5–5.5 |
| High density polyethylene (homopolymer) | 17.5–21 |
| Calcium carbonate filler | 15–25 |
| Titanium dioxide | 5–10 |
| Styrene-butadiene copolymer | 0–1.0 |
| Calcium oxide | 0.4–1.0. |

7. A process according to claim 1 wherein the sheet, after orientation is subjected to chemical or corona discharge treatment on the surface thereof to improve its receptivity to print or other coating that may be applied thereon.

8. A process according to claim 7 wherein, after orientation, a coating is applied on the impressioned sheet while ensuring that the impression remains visible.

9. A process according to claim 7 wherein the coating is that of a pigmented compound which is a coloured and/or fluorescent compound capable of being printed upon.

10. A process according to claim 7 wherein the watermark is applied to the sheet before applying the coating thereon.

11. A process according to claim 1 wherein recessed and/or raised portions forming the motif(s) are present on the surface of only one of the rollers which is of a smaller diameter than the other roller in abutment therewith.

12. A process according to claim 1 wherein the temperature of the rollers varies in the range from ambient to a temperature about 5° C. above the machine temperature.

13. A process according to claim 1 wherein the orientation of the sheet is carried out by stretching said sheet in the machine direction, in the transverse direction or biaxial in both directions.

14. A process according to claim 1 wherein the orientation of the sheet is by biaxial stretching in a stretch ratio from 2:1 to 10:1 in the machine direction and from 3:1 to 6:1 in the transverse direction.

15. A process according to claim 13 wherein the biaxial stretching is carried out sequentially or simultaneously.

\* \* \* \* \*

UNITED STATES PATENT AND TRADEMARK OFFICE
CERTIFICATE OF CORRECTION

PATENT NO. : 5,536,468
DATED : July 16, 1996
INVENTOR(S) : LEONARD LEESE

It is certified that error appears in the above-indentified patent and that said Letters Patent is hereby corrected as shown below:

Col. 2, l. 22, correct the spelling of the word "film"

Col. 2, l. 48, there should be a period (.) after "roller(s)."

Col. 2, l. 51, correct the spelling of the word "film"

Col. 4, l. 19, after "the" insert "raised" and cancel "in relief"

Column 7, line 8, correct the spelling of the word "sheet"

Signed and Sealed this

Eighteenth Day of February, 1997

Attest:

BRUCE LEHMAN

*Attesting Officer*     *Commissioner of Patents and Trademarks*